United States Patent [19]
Delprato et al.

[11] Patent Number: 5,322,768
[45] Date of Patent: Jun. 21, 1994

[54] SILVER HALIDE PHOTOGRAPHIC ELEMENTS WITH INFRARED ABSORBING DYES

[75] Inventors: Ivano Delprato, Rocchetta di; Stefano Mana, Fossano; Antonio Luzzi, Savona, all of Italy

[73] Assignee: Minnesota Mining and Manufacturing Company, St. Paul, Minn.

[21] Appl. No.: 965,872

[22] Filed: Oct. 23, 1992

[30] Foreign Application Priority Data

Oct. 28, 1991 [IT] Italy .................. MI91 A 002853

[51] Int. Cl.$^5$ .............................. G03C 1/06
[52] U.S. Cl. ............................ 430/522; 430/510; 430/517
[58] Field of Search ................ 430/510, 517, 522

[56] References Cited

U.S. PATENT DOCUMENTS

| | | | |
|---|---|---|---|
| 4,839,265 | 6/1989 | Ohno et al. | 430/522 |
| 4,871,656 | 10/1989 | Parton et al. | 430/522 |
| 4,882,265 | 11/1989 | Laganis et al. | 430/522 |
| 4,933,269 | 6/1990 | Parton et al. | 430/522 |
| 5,057,406 | 10/1991 | Usagawa et al. | 430/522 |
| 5,077,186 | 12/1991 | Kaneko et al. | 430/522 |
| 5,107,063 | 4/1992 | West et al. | 430/522 |

FOREIGN PATENT DOCUMENTS

0430244A1  5/1991  European Pat. Off. ....... G03C 1/83
1544726   11/1968  France .

*Primary Examiner*—Jack P. Brammer
*Attorney, Agent, or Firm*—Gary L. Griswold; Walter N. Kirn; Mark A. Litman

[57] ABSTRACT

An infrared sensitive silver halide photographic element which contains a dye represented by the following formula:

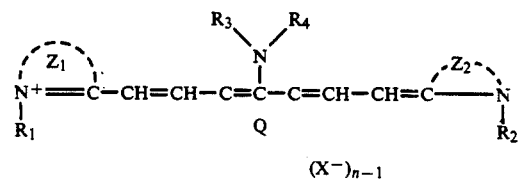

wherein $R_1$ and $R_2$ each independently represent a sulfoalkyl or a sulfatoalkyl group having 2 to 4 carbon atoms, Q represents the atoms necessary to complete a 5- or 6-membered carbocyclic ring group, $R_3$ represents an alkyl group, $R_4$ represents an aryl group, $X^-$ represents an anion, n is an integer of 1 or 2, provided that that n is 1 when the dye forms an intramolecular salt, and $Z_1$ and $Z_2$ each independently represent the atoms necessary to complete an indole nucleus.

10 Claims, No Drawings

SILVER HALIDE PHOTOGRAPHIC ELEMENTS WITH INFRARED ABSORBING DYES

FIELD OF THE INVENTION

The present invention relates to infrared absorbing dyes and to silver halide photographic elements comprising a layer containing such dyes.

BACKGROUND OF THE ART

In the field of silver halide photographic elements, it is a common practice to incorporate into a layer of the photographic element appropriate dyes absorbing specific wavelengths of light. Said dyes may be used in any layer of the photographic element, such as an interlayer, a radiation sensitive layer, an overcoat layer, an undercoat layer, a backing layer, and may be used for a variety of purposes, such as filter dyes, antihalation dyes, antiirradiation dyes or for the sensitivity control of the photographic emulsion.

The layers of the photographic elements to be added with the dyes are usually made of gelatin or other hydrophilic colloids. The dyes should have an appropriate spectral absorption according to the intended use, should be photographically inert (not affording adverse effects—such as a decrease of sensitivity, fading of the latent image, and fogging—on the performance of the silver halide emulsion layer), should be colorless, decolored or dissolved and removed during the photographic processing, and should leave little or no stain in the processed film.

Recently, information recording equipment using semiconductor laser diodes emitting in the infrared region of the electromagnetic spectrum have been developed which require silver halide photographic elements sensitive in the same area. Examples of such equipment are the laser scanners using laser diodes which have a much longer operational life and are less expensive and smaller than conventional gas lasers such as helium-neon or argon lasers. The infrared sensitive silver halide photographic elements for use with laser scanners using laser diodes need dyes for halation prevention and irradiation prevention. These dyes must absorb light in the infrared region. To this purpose, many infrared absorbing dyes have been hitherto proposed. U.S. Pat. No. 4,362,800 discloses indolotricarbocyanine dyes having two sulfoalkyl groups for use in antihalation layers, which, however, leave a greenish stain after processing. To solve the problem of staining, indolotricarbocyanine dyes for use as infrared absorbing dyes have been proposed in U.S. Pat. Nos. 4,839,265; 4,871,656; 4,876,181 and 4,933,269 and in European Patent Application Nos. 342,576 and 342,939.

A problem with these dyes is their inability to have adequate spectral absorption in the infrared region of the electromagnetic spectrum. Usually said dyes have an absorbance maximum in the desired wavelength range in molecular form but aggregate to cause a shift in the maximum absorbance wavelength. Accordingly, a deaggregating compound is usually necessary to enable said dyes to have the desired absorption maximum wavelength. Deaggregants, however, can cause adverse photographic effects, such as speed loss during storage. U.S. Pat. No. 4,871,656 discloses certain indolotricarbocyanine infrared filter dyes which do not require a deaggregant, because said dyes have an absorbance maximum in the desired wavelength range in the molecular form and do not aggregate. In particular, dyes having molecular absorption at wavelengths that are not too short are preferably benz[e]indoletricarbocyanine dyes. However, benz[e]indole rings are prepared from dangerous naphthylamine starting compounds. Accordingly, there is still the need to provide infrared absorbing filter dyes having their molecular absorption in the desired wavelength range, without a shift to the desired wavelength range brought about by aggregation, and which dyes can be synthetized using non-toxic intermediates.

U.S. Pat. No. 4,933,269 describes indolotricarbocyanine infrared absorbing filter dyes, having a 5- or 6-membered heterocyclic ring attached to the methine chain. Examples of heterocyclic rings include piperidine, pyrrolidine, indoline, 3-pyrroline, piperazine, morpholine, thiomorpholine, and other saturated heterocyclic rings. However, it has been noted in the present invention that the filter dyes of U.S. Pat. No. 4,933,269 display radiation absorption at wavelengths at or beyond 750 nm, when they are benz[e]indolotricarbocyanine dyes and aggregate.

Another problem with indolotricarbocyanine infrared absorbing filter dyes is that they have relatively narrow spectral absorption curves. Accordingly, such dyes may have problems when used with laser diodes emitting at different wavelengths of the infrared region (typical laser diode emission wavelengths are about 750, 780, 800, 820 and 870 nm) or when used with commercial samples of the same laser diode which frequently have variations in the wavelength of the emitted infrared light.

French Patent No. 1,544,726 describes tricarbocyanine dyes, for use as filter or spectral sensitizing dyes, having the formula:

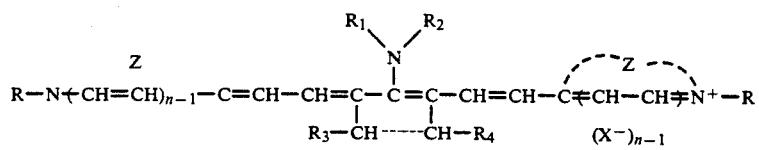

wherein n represents an integer of 1 or 2, R represents an alkyl or an aryl group, $R_1$ and $R_2$ each represents an alkyl, an alkoxycarbonylalkyl or an aryl group, $R_3$ and $R_4$ each represents an hydrogen atom, a halogen atom, an alkyl or an alkoxy group, X represents an anion, m represents an integer of 1 or 2, provided that m is 1 when R represents a carboxyalkyl or a sulfoalkyl group, and Z represents the atoms necessary to complete a thiazole, benzothiazole, naphthothiazole, thionaphtheno-7',6',4,5-thiazole, oxazole, benzoxazole, naphthoxazole, selenazole, benzoselenazole, naphthoselenazole, thiazoline, 2-pyridine, 4-pyridine, 2-quinoline, 4-quinoline, 1-isoquinoline, 3-isoquinoline, 3,3-dialkylindolenine, imidazole, benzimidazole or naphthimidazole. Said dyes are said to have a maximum absorption in organic solvents between 750 and 800 nm and aggregate when in water solution to give maximum absorption in the range of 950 to 1090 nm. In said patent there are specific examples of tricarbocyanine dyes derived from benzoxazole or benzothiazole nucleus in which $R_1$ may be a methyl group and $R_2$ may be a phenyl group.

Despite of the fact that by selecting among many substituents there is the possibility of having $R_1$ different from $R_2$ in tricarbocyanine dyes (see U.S. Pat. No. 4,871,656, EP 251,282 and FR 1,544,726), no one of said references has specifically recognized that when $R_1$ is different from $R_2$ in tricarbocyanine dyes derived from indole nucleus, dyes are provided which have spectral absorption in the infrared region without aggregating in water and relatively broad spectral absorption curves.

SUMMARY OF THE INVENTION

The present invention provides a silver halide photographic element comprising a support, at least one silver halide emulsion photosensitive layer and at least one hydrophilic colloid non-photosensitive layer wherein at least one of said layers contains an absorbing amount of a dye represented by the following formula:

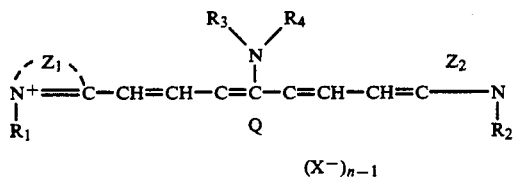

$$(X^-)_{n-1}$$

wherein:
$R_1$ and $R_2$ each independently represents a sulfoalkyl or a sulfatoalkyl group having 2 to 4 carbon atoms,
Q represents the atoms necessary to complete a 5- to 7-membered carbocyclic ring group,
$R_3$ represents an alkyl group,
$R_4$ represents an aryl group,
$X^-$ represents an anion,
n is an integer of 1 or 2, provided that n is 1 when the dye forms an intramolecular salt, and
$Z_1$ and $Z_2$ each independently represents the atoms necessary to complete an indole nucleus.

In another aspect, the present invention provides infrared absorbing dyes having the formula above.

The dyes of the present invention have satisfactory absorbing spectral characteristics in a desired wavelength range in the infrared region in molecular form without aggregating in water, have broader spectral absorption curve than structurally close dyes having $R_3$ and $R_4$ different from the described combination, are stable during storage at high temperature and humidity, are inactive to silver halide emulsions and are capable of being decolored and dissolved out of the photographic element during the photographic processing with little or no residual dye stain after the processing.

DETAILED DESCRIPTION OF THE INVENTION

In the formula of the infrared absorbing dyes of the present invention, $R_1$ and $R_2$ each independently represents sulfoalkyl or sulfatoalkyl of from 2 to 4 carbon atoms. Additionally, substituted sulfoalkyl and sulfatoalkyl are useful as $R_1$ and $R_2$. Such groups may be substituted with substituents such as methyl, hydroxy, and halogen such as Cl or F. Examples of $R_1$ and $R_2$ include sulfoethyl, 2-sulfopropyl, 3-sulfopropyl, 3-sulfobutyl, 4-sulfobutyl, 3-sulfatopropyl, and 2-hydroxy-3-sulfopropyl.

Q represents the atoms necessary to complete a substituted or unsubstituted 5- to 7-membered carbocyclic ring, preferably a 6-membered carbocyclic ring (e.g., cyclohexene). This ring can be substituted, as known to one skilled in the art. Examples of substituents include substituted or unsubstituted alkyl (e.g., methyl, ethyl, propyl, chloroethyl, benzyl), substituted or unsubstituted aryl (e.g., phenyl, p-chlorophenyl), halogen (e.g., chloro, fluoro), hydroxy, alkoxy (e.g., methoxy, ethoxy), and other conventional dye substituents that would be apparent to one skilled in the art.

$R_3$ represents an alkyl group (preferably of 1 to 4 carbon atoms, e.g., methyl, ethyl, propyl, butyl) which may be substituted with known substituents (substituted with, for example, hydroxy and halogen such as Cl or F).

$R_4$ represents an aryl group (preferably of 6 to 15 carbon atoms, e.g., phenyl, naphthyl) which may be substituted, as known in the art. Examples of substituents include alkyl such as alkyl from 1 to 4 carbon atoms (e.g., methyl, ethyl, butyl), which may themselves be substituted with known substituents such as hydroxy, halogen, and the like (e.g., hydroxyethyl, chloroethyl), carboxylate of from 1 to 4 carbon atoms (e.g., methyl ester, ethyl ester), amido, sulfonamido, halogen (e.g., chloro, fluoro), and others that would be known to one skilled in the art. Preferred example of $R_3$ is methyl and of $R_4$ is phenyl.

The anion represented by $X^-$, although not particularly restricted, is, for example, a halogen ion (e.g., chloride, bromide, iodide), p-toluene sulfonate, ethyl sulfate, perchlorate, or the like.

$Z_1$ and $Z_2$ each independently represents the atoms necessary to complete a substituted or unsubstituted indole nucleus. These indole nuclei may be substituted by any of a number of groups known to be substituents for such nuclei. These include sulfo, halogen (e.g., chloro, fluoro), alkyl (preferably of about 1 to 4 carbon atoms, e.g., methyl, ethyl, butyl), which may themselves be substituted with known substituents such as hydroxy, halogen or sulfo, alkoxy (preferably of about 1 to 4 carbon atoms, e.g., methoxy, ethoxy, butoxy), carboxy, or carboxylate of from 1 to 4 carbon atoms (e.g., methyl ester, ethyl ester). Preferred substituents for said indole nuclei in the present invention include sulfo, sulfonamido or carbonamido groups, in particular a sulfonamido group of formula:

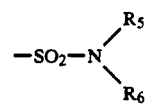

or a carbonamido group of formula:

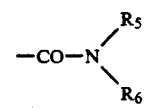

wherein $R_5$ and $R_6$ each independently represents a hydrogen atom, an alkyl group, preferably an alkyl group of up to 6 carbon atoms, an aryl group, preferably phenyl or the non-metallic atoms (e.g., carbon, nitrogen, sulfur and oxygen) necessary to form a 5- or 6-membered heterocyclic ring, preferably morpholino.

When the term "group" or "nucleus" is used in this invention to describe a chemical compound or substituent, the described chemical material includes the basic group and that group with conventional substitution. Where the term "moiety" is used to describe a chemical compound or substituent, only an unsubstituted chemical material is intended to be included. For example, "alkyl group" includes not only such alkyl moieties as methyl, ethyl, octyl, stearyl, etc., but also such moieties bearing substituents groups such as halogen, cyano, hydroxyl, nitro, amine, carboxylate, etc. On the other hand, "alkyl moiety" or "alkyl" includes only methyl, ethyl, octyl, stearyl, cyclohexyl, etc.

The preferred dyes of the present invention comprise one or two groups, $R_1$ and $R_2$, having acidic substituents, i.e. substituents capable of forming an anion, such as sulfo and sulfato, and two sulfonamido or carbonamido groups as substituents on $Z_1$ and $Z_2$. Since the acidity of an organic compound refers to a loss of protons in water and is generally expressed as pKa, i.e. $-\log_{10}$ of the dissociation constant of the chemical compound, sulfonamido and carbonamido groups having pKa values substantially higher than those of sulfo and carboxy groups are practically undissociated in aqueous medium and have negligible acidic properties, as can be evidenced by the following series: the pKa of benzenesulfonic acid is 0.7 corresponding to a dissociation in water at pH 5 higher than 99.9%, the pKa of benzenecarboxylic acid is 4.2 corresponding to a dissociation in water at pH 5 of 86.1%, the pKa of benzenesulfonamide is 10 corresponding to a dissociation in water at pH 5 of $9.99 \times 10^{-4}$ (with a ratio of neutral to anion form of approximately 100,000:1) and the pKa of benzamide is 13-14 corresponding to a dissociation in water at pH 5 of less than $9.99 \times 10^{-5}$ (see, on this matter, *The Merck Index*, 8th edition, pages 128 and 132, 1968; *Helvetica Chimica Acta*, vol. 39, page 48, 1956 and A. Albert et al., *The Determination of Ionization Constants*, page 88).

It is well-known (see U.S. Pat. No. 4,877,721) that acid substituents improve water solubility which makes dye removal easier during processing. To this end dye with more than two acid groups have been proposed for use as bleachable dyes in U.S. Pat. No. 4,839,265 and in European patent applications 251,282; 288,076 and 342,939. Surprisingly, the combination of two acidic groups and two sulfonamido or carbonamido groups has been found to give a bleachability similar to that of dyes having more than two acidic groups and a sufficient solubility in water or in substantially aqueous solvents (having more than 80% of the solvent comprised of water) to be added to the gelatin photographic compositions without the problems associated with dyes having no acidic group.

Examples of infrared absorbing dyes according to this invention include the following; however the scope of this invention is not limited to them.

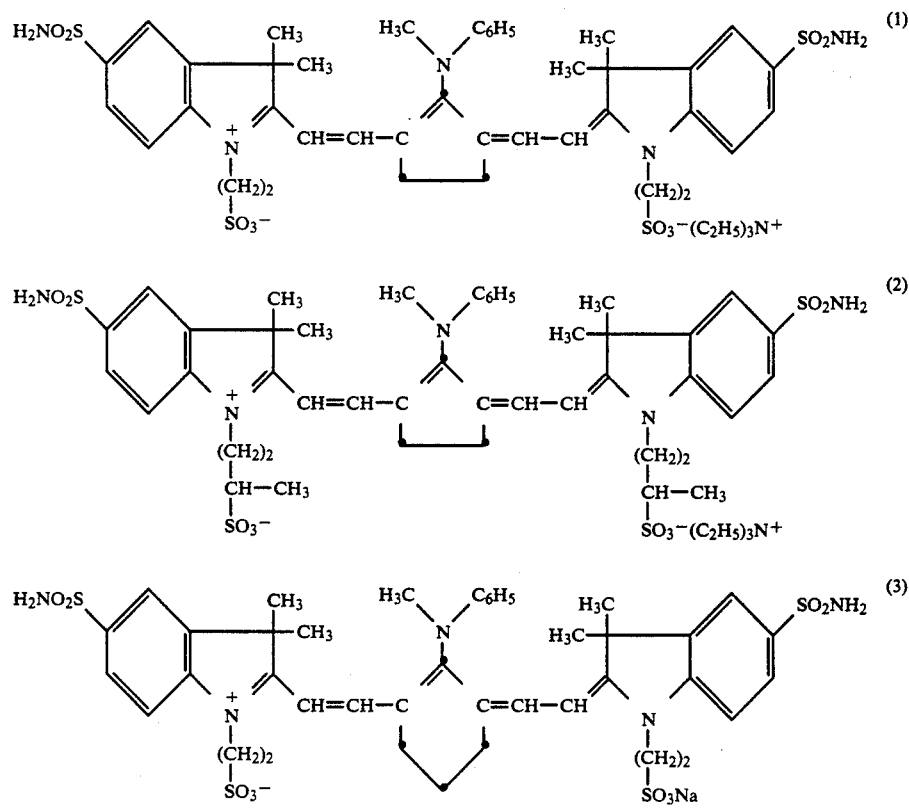

-continued
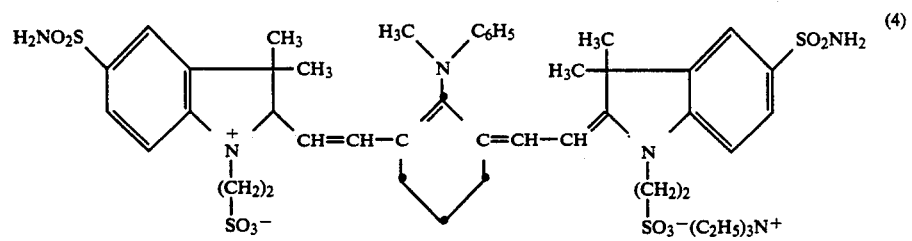
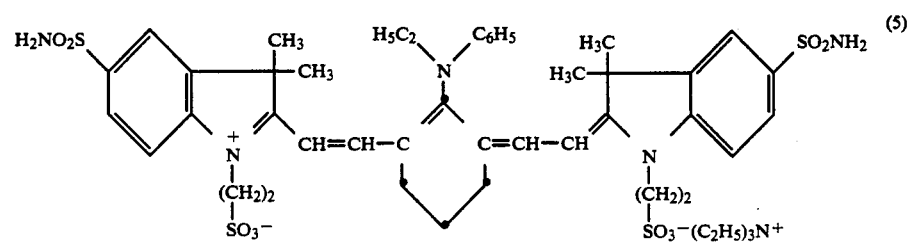
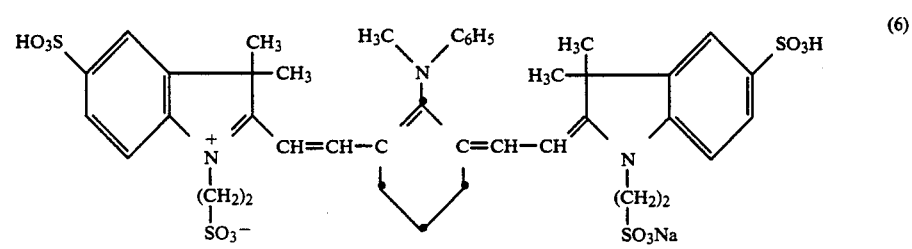
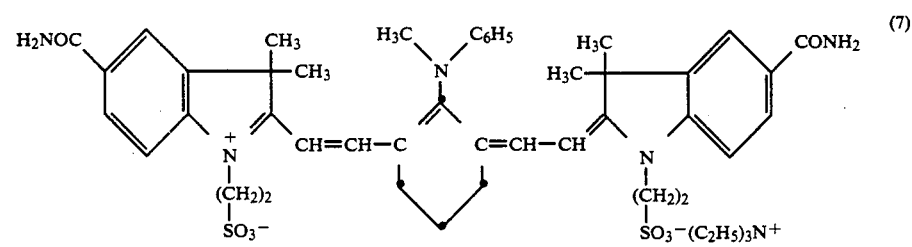
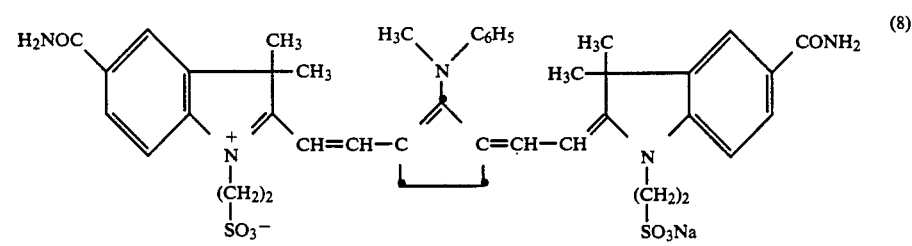
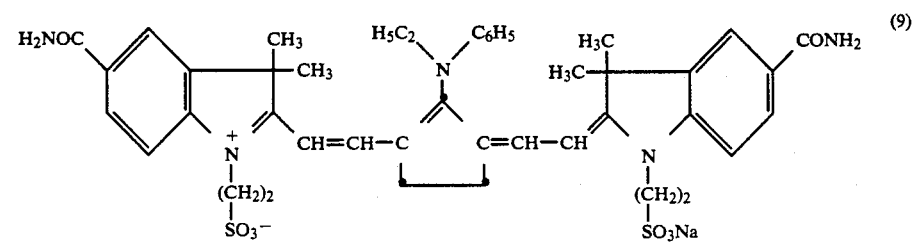

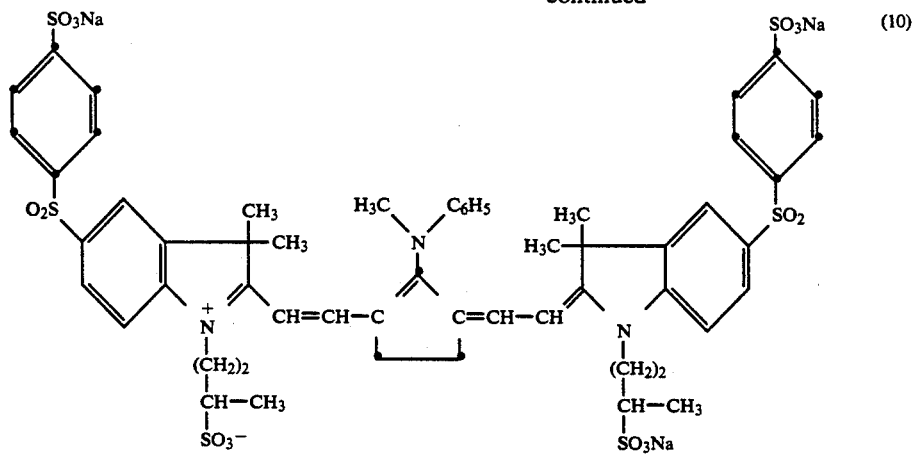

The dyes of this invention may be prepared according to the methods described in U.S. Pat. Nos. 2,985,955, 3,148,187 and 3,423,207 and in J. Chem. Soc., 189 (1933). Such a preparation process is illustrated in Example 1 hereinbelow.

The dyes of this invention absorb in the near infrared region, have very low visible absorption, and retain a high extinction coefficient at the absorption maximum. The dyes of the present invention have a molecular absorption in the desired wavelength range and are useful in infrared antihalation layers, without achieving a shift to the desired wavelength range by aggregation. In general, the dyes of the invention have extinction coefficients at their maximum absorption wavelength (typically 780 nm or higher) on the order of $2.5 \times 10^5$ to $3.5 \times 10^5$. Very surprisingly, the dyes of this invention have relatively broad spectral absorption curves as determined by their half-band width. Half-band width is the width in nanometers of the spectral photometric curve at one half the difference between maximum density and dye fog. It is a measure of the antihalonic power of the dye; the broader the half-band width, the better the antihalonic power of the dye. The dyes of the present invention have half-band widths higher than 150 nm, while the structurally related dyes not having $R_3$ and $R_4$ according to this invention have very narrow spectral absorption curves, not exceeding a half-band width of 100 nm.

The dyes may be incorporated into photographic elements as acutance dyes according to conventional techniques. The dyes may also be incorporated into antihalation layers according to techniques of the prior art, for example, as an antihalation backing layer, an antihalation underlayer or an overcoat layer. Incorporation of the dyes of this invention into the silver halide emulsion layers or other hydrophilic colloid layers may be easily carried out in the usual manner. In general, the dye is dissolved in water or aqueous solutions of water and another water soluble solvent such as methanol, ethanol, or acetone, to make an aqueous solution to be added to a coating composition, and the coating composition is then coated by a known method.

The dyes of this invention are generally added to the photographic element in a sufficient amount to provide a trasmissive optical density of greater than 0.1 at the lambda max of the dye. Generally, the coating weight of the dye which will provide the desired effect is from 1.0 to 0.01 g/sq. meter.

Examples of silver halide photographic materials applicable to this invention include black-and-white and color photographic elements.

The silver halide employed in this invention may be any of silver chloride, silver bromide, silver iodide, silver chlorobromide, silver chloroiodide, silver chloroiodobromide and the like.

The silver halide grains in the photographic emulsion may be regular grains having a regular crystal structure such as cubic, octahedron, and tetradecahedron, or the spherical or irregular crystal structure, or those having crystal defects such as twin plane, or those having a tabular form, or combinations thereof. Crystals having epitaxial growth thereon may also be used.

The photographic element comprising a layer including the dyes of this invention may be coated on any suitable support material used in photography such as cellulose acetate, cellulose nitrate, coated paper, paper, polymeric film, polyesters, such as polyethylene terephthalate, etc.

As the binder or protective colloid for use in the photographic element, gelatin is advantageously used, but other hydrophilic colloids may be used alone or in combination with gelatin such as gelatin substitutes, modified gelatin, collodion, gum arabic, cellulose ester derivatives such as alkyl esters of carboxylated cellulose, hydroxy ethyl cellulose, carboxy methyl cellulose, synthetic resins, such as the amphoteric copolymers described in U.S. Pat. No. 2,949,442, polyvinyl alcohol, and others well known in the art.

The photographic elements utilizing the infrared absorbing dyes of this invention have infrared light-sensitive silver halide emulsion layers, i.e. silver halide emulsions most sensitive to the light of wavelength of 750 nm or more, preferably 750 to 1200 nm. The silver halide emulsions are sensitized for infrared absorption by any of the spectral sensitizers commonly used to produce the desired sensitometric characteristics.

Methods for making such elements, means for sensitizing them to infrared radiation and incorporating the dyes of this invention, use of additives such as chemical sensitizers, antifoggant and stabilizers, desensitizers, brightening agents, couplers, hardening agents, coating aids, plasticizers, lubricants, matting agents, high-boiling organic solvents, development accelerating compounds, antistatic agents, antistain agents, and the like are described for example, in Research Disclosure Vol. 176, No. 17643, December 1979, Sections I to XIV.

These and other conventional aspects of photography are useful in the practice of the present invention.

The present invention is further illustrated in detail by the following examples, but the invention is not limited to and by the examples.

EXAMPLE 1

(Synthesis of Dyes)

a) Dye 1

Equimolar amounts of 2,3,3-trimethyl-5-sulfamoyl-indolenine (prepared as described at col. 11, lines 30–40, of U.S. Pat. No. 4,062,682 with a yield of 92%) and 2-chloroethanesulfonylchloride in acetonitrile were stirred at room temperature overnight. The separated solid was collected, washed with acetonitrile and dried to give yield of 90% of the intermediate compound A:

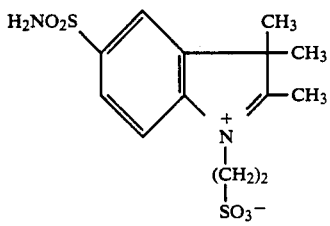

Intermediate compound B having the formula

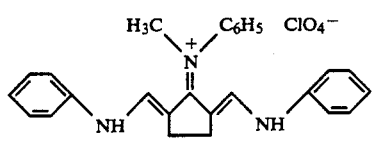

was prepared as described in FR 1,544,726.

A mixture of 1 g of Compound A and 1 g of Compound B in 7 ml of a solution of acetic anhydride and acetic acid (3:2 w/w) was refluxed for two minutes. Diisopropylethylamine (1.2 ml) was added and the mixture stirred overnight at room temperature. Then 15 ml of acetic anhydride were added and the precipitated solid was collected, washed with a few ml of the solvent mixture and dried to give 0.7 g of a green-gold powder with lambda max in methanol at 774 nm of Dye 1 corresponding to the formula

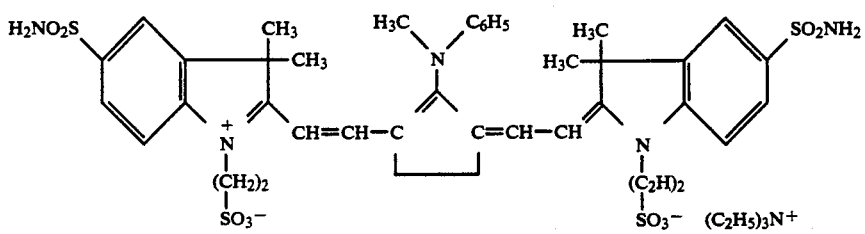

b) Comparison Dye A

Intermediate compound C corresponding to the formula

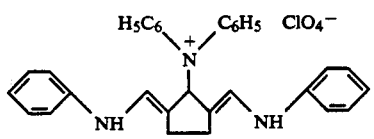

was prepared as described in FR 1,544,726.

The intermediate compound A (2.52 g), intermediate compound C (1.90 g), and diisopropylamine were refluxed in 22 ml of a mixture of acetic anhydride and acetic acid (3:2 w/w). After standing overnight, the mixture was poured in ethylacetate. The separated solid was collected, dried and crystallized from methanol to give 2.0 g of the Comparison Dye A with lambda max in methanol at 782 nm, corresponding to the formula:

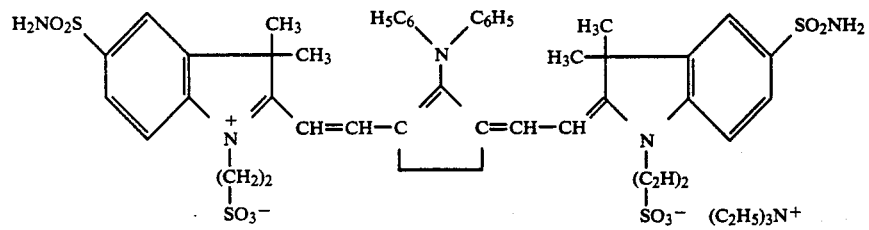

c) Comparison Dye B

A mixture of 2.6 g of Compound A, 0.68 g of 3-hydroxymethylene-2-chlorocyclohexenealdehyde in 18 ml of a solution of acetic anhydride and acetic acid (3:2 w/w) was stirred a few minutes at room temperature. Diisopropylethylamine (1.28 ml) was added and the mixture stirred overnight at room temperature. The precipitated solid was collected, washed with a few ml of the solven mixture and dried to give 2.8 g of a green-gold powder with lambda max in methanol at 786 nm of the Comparison Dye B corresponding to the formula

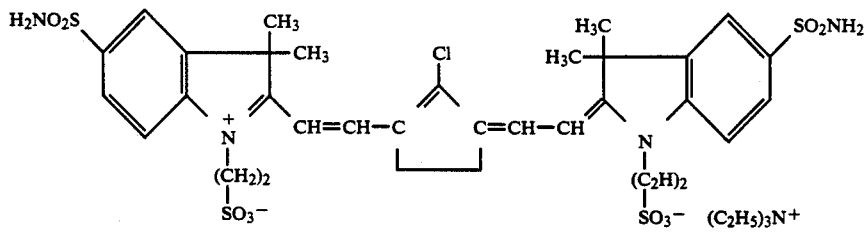

d) Comparison Dye C

Comparison Dye B (15 g) and pyrazole (75 g) were held at 100° C. for 30 minutes. The melt composition was added with a 3:2 by volume mixture of methanol-ethanol (220 ml). The separated solid was collected and dried to give Comparison Dye C (12 g) with lambda max in methanol at 792 nm corresponding to the formula:

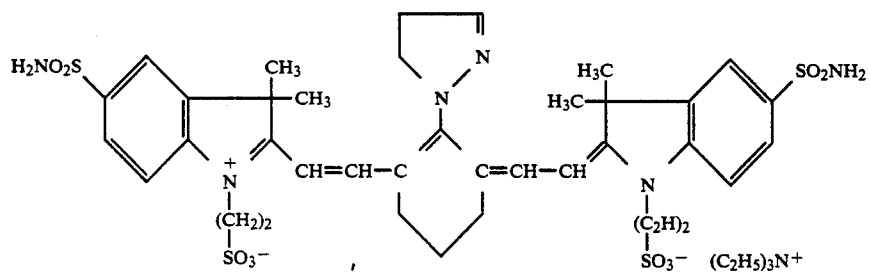

e) Comparison Dye D

By following the same procedure for obtaining Comparison Dye C, Comparison Dye D was obtained starting from Intermediate Compound D

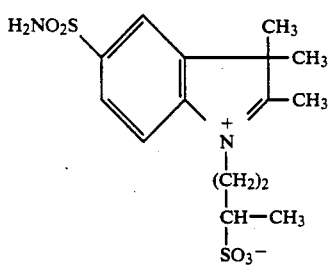

having a lambda max in methanol at 793 nm and corresponding to the formula f) Comparison Dye E 5-phenylsulfonylindolenine (30 g) was added to (20% by weight of $SO_3$) fuming sulfuric acid (120 ml), and stirred overnight. The solution was poured into crushed ice (200 g), and the separated solid filtered, washed with water and then with ethanol. The solid was dried under vacuum to give 34 g of the intermediate compound E

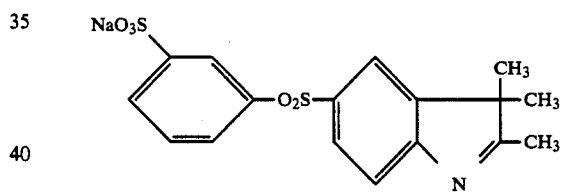

The intermediate compound E (18 g) in butyronitrile (50 ml) and triethylamine (4.9 g) were added with 2,4-butanesultone (8 g). The resulting solution was held at 110° C. overnight. The separated product was washed twice with acetone and then ground with ethylacetate. The resulting solid was filtered and dried under vacuum. 10 g of the dried solid were dissolved in methanol (35 ml) and NaI (10 g) was added. The separated solid was filtered, dried under vacuum to give 6 g of the intermediate compound F

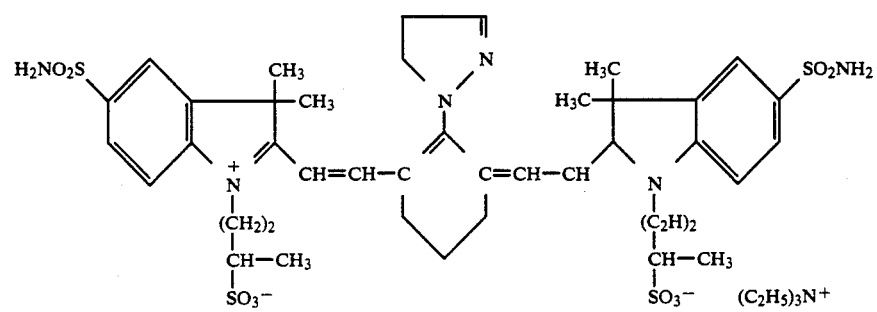

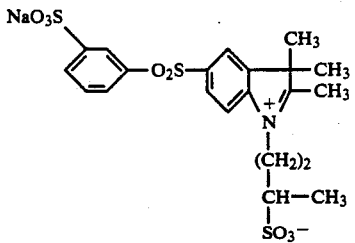

The intermediate compound F (11 g) and 3-dimethylaminomethylene-2-chloro-1-cyclopentenealdehyde (1.5 g) in acetic anhydride (50 ml) were heated at 100° C. for one hour. The separated solid was filtered and dried. To the crude dye in methanol (80 ml) was added ethanol (60 ml) and the separated solid was filtered and dried to give 4 g of the comparison dye E with lambda max in methanol at 816 nm corresponding to the formula

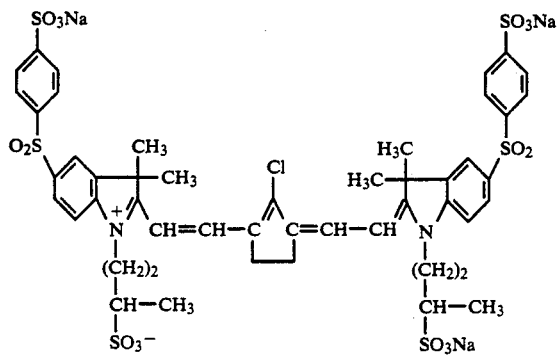

g) Comparison Dye F

Comparison Dye E (0.2 g), and pyrazole (1 g) were heated at 100° C. for 15 minutes. Methanol (2 ml) was added and the mixture poured in acetone (50 ml). The separated solid was filtered and washed with acetone to give 0.1 g of Comparison Dye F with lambda max in methanol at 812 nm corresponding to the formula

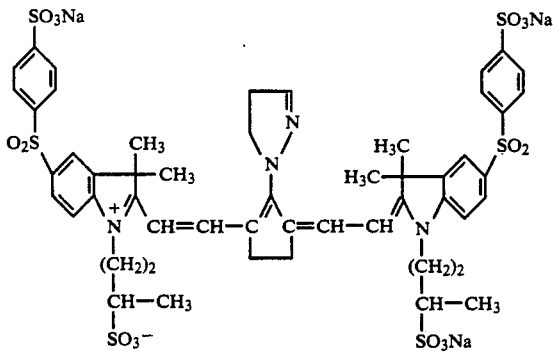

EXAMPLE 2

This example illustrates the desirable absorption and the broad spectral absorption curve of the infrared antihalation dyes of this invention, and the narrow spectral absorption of comparison dyes rendering them unsuitable as broad band infrared absorbing antihalation dyes.

8 ml of a solution comprising 9 ml of water, 1 ml of methyl alcohol, 0.05 g of each dye was added to 175 ml of water at 38° C. comprising 6.7 ml of a 10% (w/w) aqueous solution of Hostapur TM SAS (an anionic surfactant of the alkane sulfonate sodium salt type manufactured by Hoechst AG) and 3.5 ml of a 1.6% (w/w) aqueous solution of formaldehyde. The above-prepared coating solution was applied to a 7 mil (18/100 mm) subbed polyethylene terephthalate support. The coated layer was then dried. The resulting antihalation layer contained 3.5 g gelatin/sq. meter. A hardened gelatin antiabrasion layer comprising surfactants, matting agents and formaldehyde hardener was coated at a gelatin coverage of 1 g per sq. meter over the antihalation layer. A silver halide emulsion layer, spectrally sensitized to 810 nm was coated on the opposite side of the support. A hardened gelatin antiabrasion layer comprising surfactants, matting agents and formaldehyde hardener was coated at a gelatin coverage of 1 g per sq. meter over the silver halide emulsion layer.

Each film was exposed to an EDG sensitometer with a neutral density filter and a Wratten ® 87 filter (manufactured by Eastman Kodak Co.) through a standard step-wedge and developed for 27 seconds at 35° C. in a 3M XAD/2 developer, fixed for 27 seconds at 30° C., washed with tap water for 22 seconds at 35° C. and dried for 22 seconds at 35° C. in a Trimatic TM XP 515 roller transport processor. The following table reports the lambda max of each dye in methanolic solution ($\lambda$max1), the lambda max of each gelatin coated sample ($\lambda$max2) and the half-band width.

TABLE

| Film | Dye | $\lambda$ max 1 (nm) | $\lambda$ max 2 (nm) | Half band width (nm) |
|---|---|---|---|---|
| 1 | 1 | 774 | 775 | 163 |
| 2 | A | 782 | 800 | 75 |
| 3 | B | 806 | 815 | 55 |
| 4 | C | 792 | 803 | 63 |
| 5 | D | 793 | 806 | 56 |
| 6 | E | 816 | 830 | 52 |
| 7 | F | 802 | 816 | 62 |

The results show that the dyes according to the present invention, in which the substituent $R_3$ is an alkyl group and the substituent $R_4$ is an aryl group, provide the desired absorption in the IR region of the electromagnetic spectrum without the need of aggregation and have broad half-band width. The comparison dyes, on the contrary, have very narrow half-band widths. Dyes in which both $R_3$ and $R_4$ are alkyl groups have been not prepared, because they have absorption outside IR range, as reported in Zhurnal Organicheskoi Kimii, vol. 15, no. 2, pages 400–407 (February 1979).

We claim:

1. A silver halide photographic element comprising a support, at least one infrared sensitive silver halide emulsion photosensitive layer and at least one hydrophilic colloid non photosensitive layer wherein at least one of said layers contains an infrared absorbing amount of a dye represented by the following formula

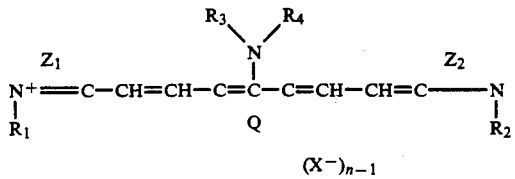

wherein
R₁ and R₂ each independently represents a sulfoalkyl or a sulfatoalkyl group having 2 to 4 carbon atoms, Q represents the atoms necessary to complete a 5- to 7-membered carbocyclic ring group, R₃ represents an alkyl group, R₄ represents an aryl group, X⁻ represents an anion, n is an integer of 1 or 2, provided that n is 1 when the dye forms an intramolecular salt, and Z₁ and Z₂ each independently represents the atoms necessary to complete an indole nucleus wherein the indole nucleus is substituted with a sulfonamido group of formula

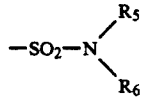

wherein R₅ and R₆ each independently represents hydrogen, alkyl or aryl or together represent the non-metallic atoms necessary to form a 5- or 6-membered heterocyclic ring or

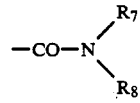

wherein R₇ and R₈ each independently represents hydrogen, alkyl or aryl.

2. The element of claim 1, wherein R₃ represents a methyl group, and R₄ represents a phenyl group.

3. The element of claim 1, wherein the indole nucleus is substituted with a sulfonamido group of formula

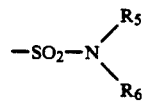

wherein R₅ and R₆ each independently represents hydrogen, alkyl or aryl or together represent the non-metallic atoms necessary to form a 5- or 6-membered heterocyclic ring.

4. The element of claim 1, wherein the indole nucleus is substituted with a carbonamido group of formula

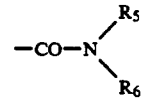

wherein R₅ and R₆ each independently represents hydrogen, alkyl or aryl.

5. The element of claim 1, wherein the dye is in an amount of 1.0 to 0.01 g/m².

6. The element of claim 1, wherein the dye is present in a silver halide emulsion layer.

7. The element of claim 1, wherein the dye is present in a hydrophilic colloid non photosensitive layer.

8. The element of claim 7, wherein said hydrophilic colloid non-photosensitive layer is a layer positioned on the back side of the support.

9. The element of claim 7 wherein said hydrophilic colloid non- photosensitive layer is an interlayer between the support and a silver halide emulsion photosensitive layer.

10. The element of claim 7, wherein said hydrophilic colloid non photosensitive layer is a protective layer positioned on a silver halide emulsion photosensitive layer.

* * * * *

UNITED STATES PATENT AND TRADEMARK OFFICE
CERTIFICATE OF CORRECTION

PATENT NO. : 5,322,768
DATED : June 21, 1994
INVENTOR(S) : Delprato et al.

It is certified that error appears in the above-indentified patent and that said Letters Patent is hereby corrected as shown below:

Column 2, lines 45-49, delete

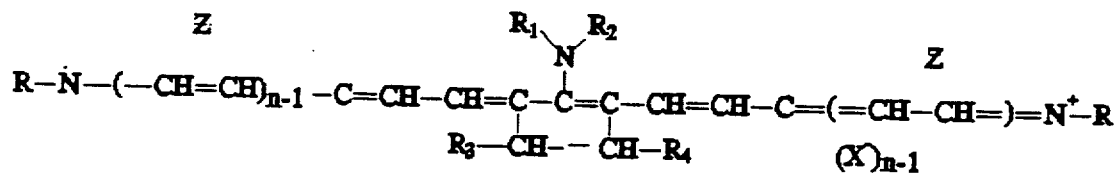

and insert therefor,

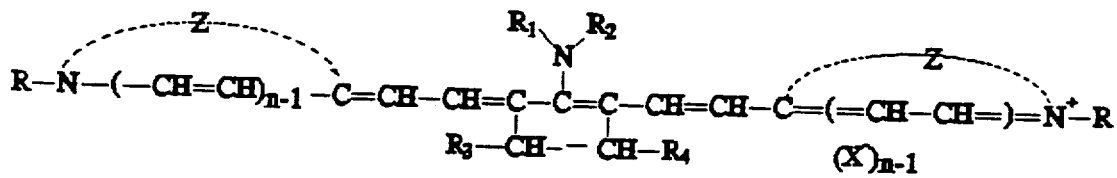

UNITED STATES PATENT AND TRADEMARK OFFICE
CERTIFICATE OF CORRECTION

PATENT NO. : 5,322,768
DATED : June 21, 1994
INVENTOR(S) : Delprato et al.

Page 2 of 5

It is certified that error appears in the above-indentified patent and that said Letters Patent is hereby corrected as shown below:

Column 3, lines 21-29, delete

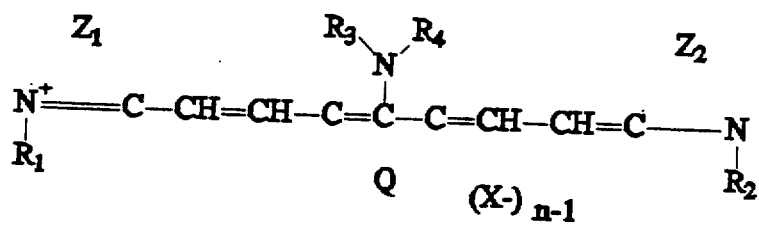

and insert therefor,

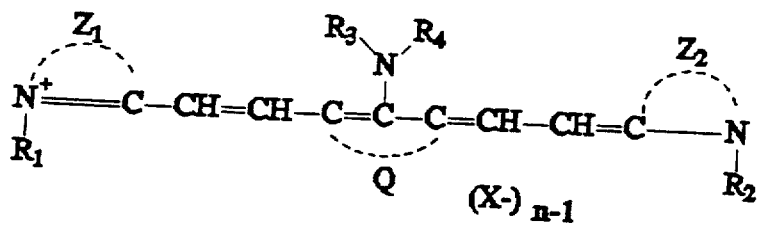

UNITED STATES PATENT AND TRADEMARK OFFICE
CERTIFICATE OF CORRECTION

PATENT NO. : 5,322,768
DATED : June 21, 1994
INVENTOR(S) : Delprato et al.

Page 3 of 5

It is certified that error appears in the above-indentified patent and that said Letters Patent is hereby corrected as shown below:

Column 16, line 3, after the word "comprising" and before the words "6.7 ml of a 10% (w/w)", insert --6.7 g gelatin--.

UNITED STATES PATENT AND TRADEMARK OFFICE
CERTIFICATE OF CORRECTION

PATENT NO. : 5,322,768   Page 4 of 5
DATED : June 21, 1994
INVENTOR(S) : Delprato et al.

It is certified that error appears in the above-indentified patent and that said Letters Patent is hereby corrected as shown below:

Column 16, lines 60-68, delete

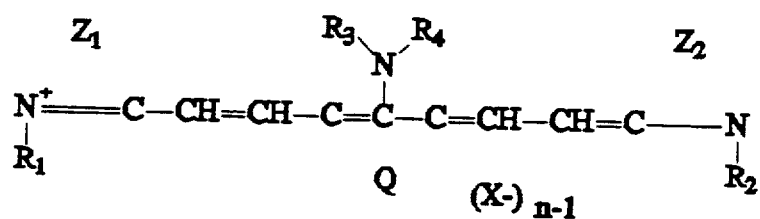

UNITED STATES PATENT AND TRADEMARK OFFICE
CERTIFICATE OF CORRECTION

PATENT NO. : 5,322,768
DATED : June 21, 1994
INVENTOR(S) : Delprato et al.

It is certified that error appears in the above-indentified patent and that said Letters Patent is hereby corrected as shown below:

and insert therefor,

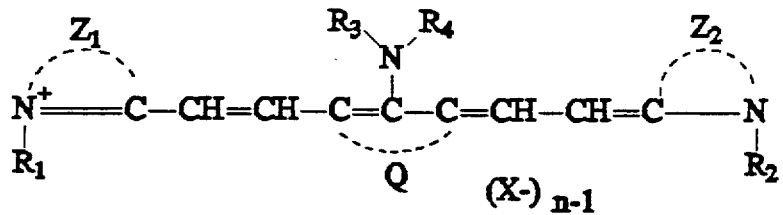

Signed and Sealed this

Twentieth Day of December, 1994

Attest:

BRUCE LEHMAN

Attesting Officer   Commissioner of Patents and Trademarks